(12) United States Patent
Phinney et al.

(10) Patent No.: US 7,568,802 B2
(45) Date of Patent: Aug. 4, 2009

(54) EYE-SAFE NEAR INFRA-RED IMAGING ILLUMINATION METHOD AND SYSTEM

(75) Inventors: Thomas L. Phinney, Glendale, AZ (US); Jan Jelinek, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 281 days.

(21) Appl. No.: 11/801,517

(22) Filed: May 9, 2007

(65) Prior Publication Data
US 2008/0277601 A1    Nov. 13, 2008

(51) Int. Cl.
*A61B 3/00* (2006.01)
*A61B 3/10* (2006.01)
*G06K 9/00* (2006.01)

(52) U.S. Cl. .................. 351/246; 351/221; 382/117
(58) Field of Classification Search .......... 351/221, 351/246; 382/117; 356/51
See application file for complete search history.

(56) References Cited

U.S. PATENT DOCUMENTS

| | | | | |
|---|---|---|---|---|
| 4,960,988 A | | 10/1990 | Simms | ............... 250/213 VT |
| 5,048,946 A | * | 9/1991 | Sklar et al. | ............... 351/206 |
| 6,309,070 B1 | * | 10/2001 | Svetliza et al. | ............... 351/221 |
| 6,792,020 B2 | * | 9/2004 | Romm | ............... 372/38.09 |
| 2004/0240711 A1 | | 12/2004 | Hamza et al. | ............... 382/118 |
| 2006/0165266 A1 | | 7/2006 | Hamza | ............... 382/117 |

* cited by examiner

*Primary Examiner*—Jordan M. Schwartz
(74) *Attorney, Agent, or Firm*—Kris T. Fredrick

(57) ABSTRACT

A method and system for eye-safe near infra-red (NIR) optical imaging illumination. An eye of an intended subject are imaged with visible light or NIR light at an unconditionally eye-safe illumination level and the maximum permissible eye-safe NIR illumination that can be applied to the eye is determined from the captured images. The eye of the intended subject can then be illuminated with at least one substantially maximal NIR light pulse having a pulse intensity and duration selected to provide the substantially maximum permissible eye-safe NIR illumination intensity at the eye. NIR light pulse illumination can be inhibited in response to detection of other subjects either within the vicinity of a volume extending between an NIR illuminator illuminating the eye and the intended subject. The likelihood that an intended subject has been recently illuminated can also be determined and statistical measures can be used to avoid re-illuminating subject unnecessarily.

19 Claims, 5 Drawing Sheets

US 7,568,802 B2

EYE-SAFE NEAR INFRA-RED IMAGING ILLUMINATION METHOD AND SYSTEM

FEDERALLY-SPONSORED RESEARCH AND DEVELOPMENT

This invention was made with Government Support under a Biometric COE contract funded by the U.S. Government. As such, the U.S. Government has certain rights in this invention.

TECHNICAL FIELD

The embodiments relates to near infra-red (NIR) imaging illumination and, more particularly, to methods for eye-safe NIR imaging illumination for recognition systems, especially iris recognition systems. Embodiments also relate to NIR imaging illumination systems, such as eye-safe combined face and iris recognition systems.

BACKGROUND

Imaging human irises for biometric identification purposes usually requires that the subject's iris be illuminated in near-infrared (NIR) wavelengths just beyond those of visible red light. Bright light at such wavelengths is not visible and does not trigger an aversion response, such as pupil narrowing, blinking or averted gaze. Despite humans being relatively unaware of such illumination, it passes through the cornea and lens of the eye, where it is magnified by a varying amount, dependent primarily on the pupil size, and focused on the retina. Optical gain of a retina with a dilated iris can increase the incident optical power on the central high-acuity cells of a fovea by a factor of 100×. NIR light pulses above a certain intensity or total energy can damage the retina, particularly the cells of the fovea which provide acute central vision. US and international eye safety regulations strongly constrain the time-energy profile of deliberate NIR radiation that can reach an unprotected eye ball.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect, a method for eye-safe near infra-red (NIR) optical imaging illumination comprises imaging an eye of an intended subject with visible or NIR light at an unconditionally eye-safe illumination level; determining from the imaging a substantially maximum permissible eye-safe NIR illumination that can be applied to the eye; and illuminating the eye with at least one substantially maximal NIR light pulse, such as a collimated NIR beam pulse of substantially constant diameter or a diverging NIR beam pulse, having a pulse intensity and duration selected to provide the substantially maximum permissible eye-safe NIR illumination at the eye.

Determining the maximum permissible eye-safe NIR illumination for the eye of the subject from the captured images and illuminating the eye of the intended subject with at least one NIR light pulse having a pulse duration and intensity selected to provide the substantially maximum permissible eye-safe NIR illumination at the eye. Use of a substantially maximal NIR light pulse reduces the inherent noise within those images and allows the distance at which the eyes can be imaged to be maximized.

Imaging the eye of an intended subject with NIR light can comprise operating an NIR illuminator to illuminate the eye with the NIR light at an unconditionally eye-safe illumination level; and illuminating the eye with at least one substantially maximal NIR light pulse having a pulse intensity and duration selected to provide the substantially maximum permissible eye-safe NIR illumination can comprise adjusting the NIR illuminator to select the pulse intensity and/or duration of the at least one substantially maximal NIR pulse preparatory to operating the NIR illuminator to illuminate the eye with the at least one substantially maximal NIR pulse.

The method can include determining the color of the eye of the intended subject from imaging of the eye. Imaging the eye of the intended subject with visible light can comprise capturing images of the pupil and iris of a substantially light colored eye illuminated with the visible light at an unconditionally eye-safe illumination level; and determining the substantially maximum permissible eye-safe NIR illumination level from the captured images. Determining the substantially maximum permissible eye-safe NIR illumination level from the captured images can comprise estimating the optical gain of the eye from the imaged pupil and iris, and calculating the substantially maximum permissible eye-safe NIR illumination level from the optical gain.

Imaging the eye of the intended subject with NIR light at an unconditionally eye-safe illumination level can comprise capturing images of the pupil and iris of a substantially dark colored eye illuminated with the NIR light at an unconditionally eye-safe illumination level; and determining the substantially maximum permissible eye-safe NIR illumination that may be applied to the eye of the intended subject from the captured images. Determining the substantially maximum permissible eye-safe NIR illumination that may be applied to the eye of the intended subject from the captured images can comprise estimating the optical gain of the eye of the intended subject from the imaged pupil and iris and calculating the substantially maximum permissible eye-safe illumination from the estimated optical gain.

The method can further comprise detecting another subject who may have an eye at risk at or in the vicinity of a volume extending between an NIR illuminator for illuminating the eye of the intended subject; and inhibiting the NIR illuminator from illuminating that subject in response to detecting the another subject. In this manner, other subjects which are in the vicinity of the imaging illumination can advantageously be prevented from being illuminated with high intensity NIR illumination.

The method can further comprise assessing from the imaging with unconditional eye safe means whether subject has been recently illuminated; and Illuminating or avoiding illuminating the subject with at least one NIR pulse based on whether the intended subject has been recently illuminated to thereby ensure that re-illumination of subjects is controlled so that short-term and time-averaged NIR illumination received by the subjects' eyes is constrained to long-term safe levels.

The method can further comprise executing an avoidance probability algorithm that decays with time since any most recent likely illumination to avoid re-illuminating the subject unnecessarily.

According to another aspect, the method for eye-safe near infra-red (NIR) optical imaging illumination comprises illuminating an eye of an intended subject with visible light or NIR light at an unconditionally eye-safe illumination level; capturing images of the eye illuminated with the visible or NIR light; determining from the captured images the maximum permissible eye-safe NIR illumination that can be applied to the eye; illuminating the eye of the intended subject with at least one substantially maximal NIR light pulse, the at least one substantially maximal NIR light pulse having a pulse intensity and duration selected to provide the substantially maximum permissible eye-safe NIR illumination intensity at the eye; detecting another subject who may have an eye at risk, either within a volume extending between the NIR illuminator and the intended subject or moving in a manner such that the eye of the another subject may come within the volume during the illumination of the eye of the intended subject with the at least one NIR pulse, and avoiding illuminating the intended subject with the at least one NIR pulse in response to detecting the potential for harm to an eye of the another subject.

Illuminating the eye with the NIR light at the conditionally eye-safe illumination level can comprise operating an NIR illuminator to illuminate the eye with the NIR light at the unconditionally eye-safe illumination level; and illuminating the eye with at least one substantially maximal NIR light pulse having a pulse intensity and duration selected to provide the substantially maximum permissible eye-safe NIR illumination. Illuminating the eye with at least one substantially maximal NIR light pulse having a pulse intensity and duration selected to provide the substantially maximum permissible eye-safe NIR illumination can comprise adjusting the NIR illuminator to select the pulse intensity and duration of the at least one substantially maximal NIR pulse preparatory to operating the NIR illuminator to illuminate the eye with the at least one substantially maximal NIR pulse.

Capturing images of the eye can comprise capturing images of the pupil and iris of a substantially light colored eye illuminated with visible light at an unconditionally eye-safe illumination level; and determining the maximum permissible eye-safe NIR illumination level from the captured images can comprise estimating the optical gain of the eye from the imaged pupil and iris and calculating the maximum permissible eye-safe NIR illumination based on the estimated optical gain.

Capturing the images can comprise capturing images of the pupil and iris of a substantially dark colored eye of the subject with NIR light, estimating the optical gain of the eye and determining the substantially maximum permissible eye-safe NIR illumination level based on the estimated optical gain.

The method can include detecting another subject who may have an eye at risk either within a volume extending between an NIR illuminator illuminating the at least one near-substantially maximal pulse and the intended subject or moving in a manner such that the another subject may enter within the volume during operation of the NIR illuminator to illuminate the eye of the intended subject; and inhibiting the NIR pulse illumination in response to detecting the another subject who may have an eye at risk.

Avoiding illuminating the eye of the intended subject with the at least one NIR pulse in response to detecting the potential for harm to an eye of the another subject can comprise unconditionally eye-safe imaging the intended eye; assessing from the imaging whether the intended subject has been recently illuminated; and avoiding illuminating the another subject with at least one NIR pulse based on whether the intended subject has been recently illuminated.

The method can further comprise executing an avoidance probability algorithm that decays with time since any most recent likely illumination to avoid re-illuminating the subject unnecessarily.

According to another aspect, an eye safe NIR optical imaging illumination system has at least one optical imager for unconditionally eye-safe imaging of an intended subject, an NIR illuminator for illuminating an eye of the intended subject; and a controller operably coupled to the optical imager and the NIR illuminator. The controller can be adapted and arranged to determine from the captured images of the eye of the intended subject the maximum permissible eye-safe NIR illumination that can be applied to the eye; and operate the NIR illuminator to illuminate the eye of the intended subject with at least one substantially maximal NIR light pulse having a pulse duration and intensity selected to provide the substantially maximum permissible eye-safe NIR illumination at the eye.

The system can have a sensor, operably coupled to the controller, adapted to detect another subject who may have an eye at risk at or in the vicinity of a volume extending between the NIR illuminator and the intended subject. The controller can be further adapted and configured to adjust the NIR illuminator to inhibit the NIR illumination in response to the sensor detecting the another subject who may have an eye at risk.

The controller can be further adapted and arranged to independently assess from the unconditional eye-safe imaging whether the intended subject has been recently illuminated; and operate the NIR illuminator to illuminate the other subject with at least one NIR pulse based on whether the subject has been recently illuminated.

The controller can be further adapted and arranged to estimate the optical gain of the eye of the intended subject from the imaged pupil and iris; and calculate the substantially maximum permissible eye-safe illumination from the estimated optical gain.

The at least one NIR pulse can comprise a collimated NIR beam of substantially constant diameter or a diverging NIR beam.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment of the present invention and are not intended to limit the scope of the invention.

The illustrative embodiment provides an approach to eye-safe near IR imaging which reduces the inherent noise within captured images of the eyes and allows the distance at which the eyes can be imaged to be substantially maximized. The approach can also ensure that subjects which are in the vicinity of the imaging illumination are prevented from being illuminated with high intensity NIR illumination and can further ensure that re-illumination of subjects is controlled so that accumulated NIR illumination received by the subjects' eyes is constrained to long-term safe levels.

Figure 1:
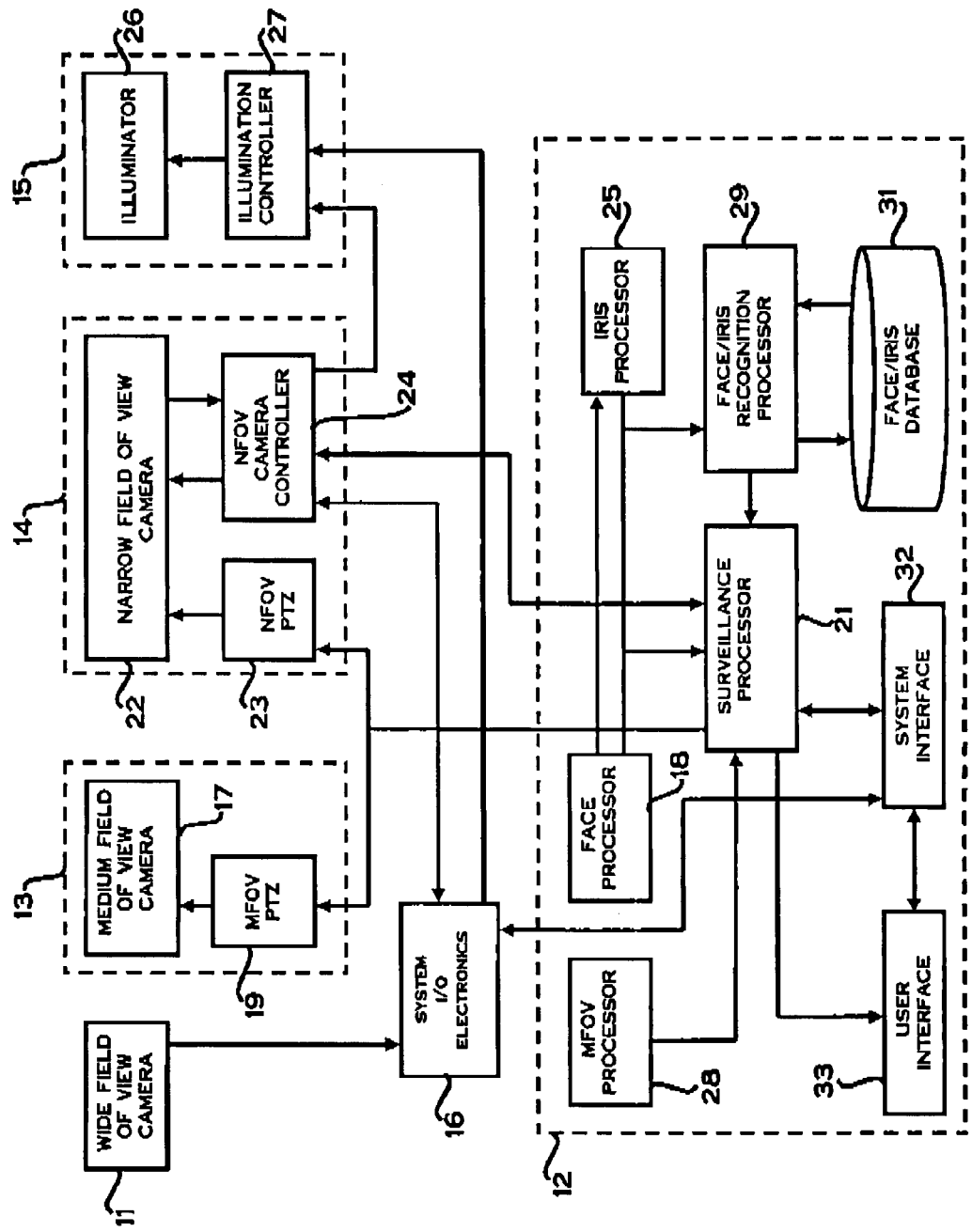
FIG. 1 illustrates a block diagram of an eye-safe face and iris recognition system suitable for implementing a method of eye-safe NIR optical imaging illumination according to a preferred embodiment.

Reference will initially be made to an NIR optical imaging system of FIG. 1 of the accompanying drawings which can be used to implement the method for eye-safe NIR optical imaging illumination according to one embodiment. System 10 is an eye-safe combined face and iris recognition system.

As a general overview, system 10 has an NIR illuminator module 15 for illuminating the eye of an intended subject, camera modules 13 and 14 for capturing images of an eye of an intended subject illuminated with visible or NIR light at an unconditionally eye-safe illumination level, and a controller 12 operably coupled to the camera modules and NIR illuminator module. As will be explained in more detail below, the controller 12 is adapted and arranged to determine from captured images of the eye illuminated with unconditionally eye-safe visible or NIR illumination the maximum permissible eye-safe NIR illumination that can be applied to the eye and to operate the NIR illuminator module 15 to illuminate the eye of the intended subject with one or more NIR light pulses having a pulse duration and intensity selected to provide the maximum permissible eye-safe NIR illumination at the eye.

The controller 12 may be any kind of computer processing unit (CPU) 12, such as a desk computer or a digital signal processor. An operating system runs on the processing unit 12 and may be a commercially available operating system. Instructions for the operating system and applications or programs are stored in storage devices, such as a hard drive. Alternatively, some or all of the controller functionality can be implemented as analogue or digital circuitry instead of a computer processor.

Related art iris recognition systems may require users to be within a few inches of the sensor and look directly into the sensor, or towards a specific area. Many such related-art systems require users to actively position themselves relative to the sensor, for example, so that they can see a reflection of their eye in the center of a small mirror. The present system does not have such a requirement. The system may use commercial off the shelf (COTS) face recognition technology combined with custom iris processing algorithms to accurately recognize subjects based on their face and iris(es) at distances significantly greater than a few inches, and without necessarily requiring their active and deliberate cooperation.

For the purposes of face and iris recognition, the present system may perform automatic illumination, detection, acquisition and recognition of faces and irises at ranges out to five meters (over 16 feet), and of faces only at much greater distances. The system may also automatically recognize multiple subjects in a scene, and optionally enroll any subjects not previously seen in a database. Relative to the operation of the system, there may be a stationary wide field of view COTS stereo camera 11 for initial subject detection. It may then use a pan-tilt-zoom (PTZ) COTS medium field of view camera 17 to zoom in and acquire the face of each subject within the field of view of camera 11. The acquired face images may be sent to a COTS face processing software package for recognition, such as with processor 18 for feature extraction and processor 29 for comparison against a database of stored sets of features. In parallel, a modified PTZ COTS narrow field of view camera 22 may acquire images of the irises for each of the subjects. The 30 system may use modified COTS or custom flash flood illuminators 26 with a controller 27 to control the amount of illumination on a subject. The acquired iris images may be processed for inferring a signature allowing recognition of a person. Various processing might be required for inferring such signature from an image, such as pupil detection, iris segmentation, feature extraction and signature matching software. These processing steps might be optimized for irises acquired at a distance where off-axis gaze and eyelid occlusions are common. The iris processing software may be specifically designed to deal with untrained or unaware users, addressing issues such as off-axis gaze and partial occlusions of the iris due to partially closed eyes.

The system may have a wide field of view (WFOV) camera 11 for surveillance of a scene having one or more subjects of interest, such as people. Camera 11 might be a wide angle stereo camera for providing distance to the targets or subjects of interest. Camera 11 may be connected to an overall 15 system processing unit 12. A medium field of view camera module 13 may be connected to unit 12. It may be used for obtaining images of faces of people. A high resolution narrow field of view camera module 14 may be connected to unit 12. Module 14 may be used for obtaining images of a feature of a face such as an iris. An illumination 20 module 15 may be connected to module 14. Module 15 may be used for illuminating items for use with the high resolution module 14 to obtain good images of both irises. Module 15 may be able to illuminate with infrared light. A system input/output interface electronics (I/O electronics) module 16 may be connected to unit 12, module 14 and module 15. Module 13 may have a medium field-of-view (MFOV) camera (e.g., security camera) 17 that is connected to a face "process" 18 in unit 12.

The term "processor" may be used in lieu of "process" in that a process would include processing. Such processes or processors may be a part of a larger processor, such as a system processor. A pan-tilt-zoom (PTZ) control unit 19 may be connected to the MFOV camera 17, controlling either motion of the camera or of mirrors interposed between the camera and the intended subject. The PTZ unit 19 may be connected to a surveillance process or processor 21 in the overall system processing unit 12. Module 14 may have a high resolution narrow field-of-view (NFOV) camera 22, and a pan-tilt-zoom (PTZ) control unit 23 connected to camera 22 and the surveillance processor 21. A NFOV camera controller 24 may be connected to the high resolution camera 22, the system I/O electronics module 16 and the surveillance processor 21. The camera might be connected to the WFOV stereo camera 11. The camera 22 may also be connected to an iris process or processor 25.

Module 15 may have an illuminator module consisting of a number of near infrared illuminators 26 and an illumination controller 27 connected to the illuminators 26. Controller 27 may also be connected to I/O electronics module 16 and the NFOV camera controller 24. The WFOV camera 11 may be connected to a WFOV process or processor 28 of unit 12. WFOV processor 28 may be connected to surveillance processor 21. The face processor 18 may be connected to the surveillance processor 21, to the iris processor 25, and to a face/iris recognition processor 29. Iris processor 25 may be connected to 20 a surveillance processor 21 and the face/iris recognition processor 29. The face/iris recognition processor 29 may be connected to the surveillance processor 21. The face/iris recognition processor 29 may be connected to a face/iris database 31. The system I/O electronics module 16 may be connected to a system processor 32. The surveillance processor 21 may be connected to the system processor 32. A user interface 33 may be connected to the surveillance processor 21 and the system processor 32.

Figure 2:
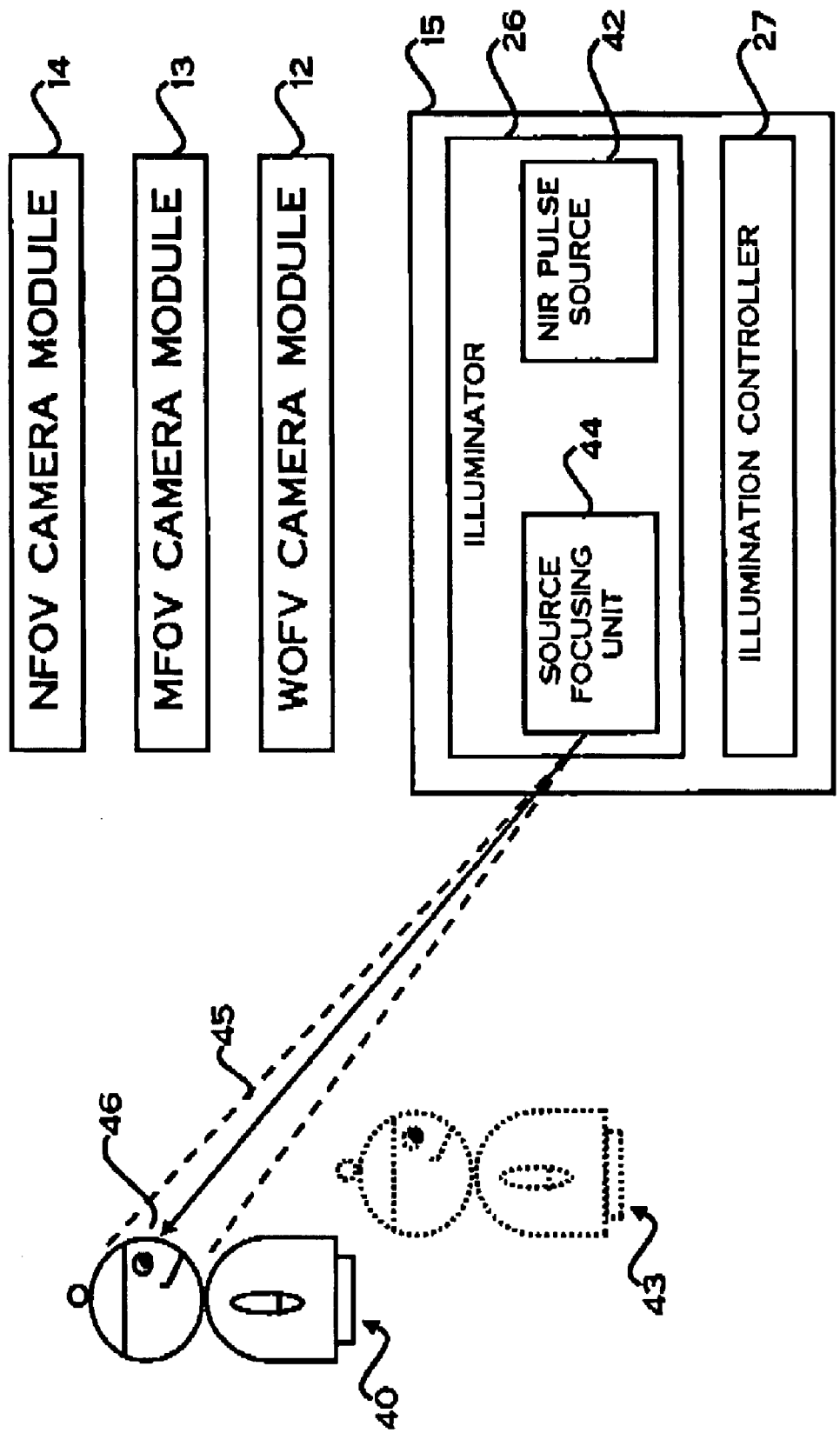
FIG. 2 illustrates the illuminator and camera modules of the system of FIG. 1 arranged relative to the intended subject according to one embodiment.

Referring additionally to FIG. 2, which illustrates the illuminator and camera modules 11, 13, 14 of the system of FIG. 1 arranged relative to the intended subject according to one embodiment, the illuminator 26 includes a NIR pulse source 42 and source-focusing system 44 for generating NIR optical energy of controlled duration, area power density and with near-uniformity at the subject distance. In the illustrative embodiment of FIG. 2, the NIR pulse source 42 is a high-power pulse source 42 which is configured to generate NIR pulses of an eye-safe pulse duration and amplitude, and the source-focusing system 44 is configured to focus the NIR pulses into a collimated beam of near-constant cross-section. The source-focusing system 44 can use a focusing mirror to generate the collimated beam so as to virtually eliminate distance-squared losses on the outbound path.

Alternatively, the source-focusing system 44 can be a variable beam width focusing system akin to a COTS wideband motorized zoom or varifocal lens operated in reverse, with the light source at the "camera" end of the lens, such that the NIR illuminator provides a diverging cross-sectional-area beam instead of a collimated beam.

WFOV camera 11, the MFOV camera module 13 and the NFOV camera module 14 and their associated processors 28, 18 and 25, each function as sensors providing information to the surveillance processor 21.

WFOV camera 11 is a visible light imager 11 which is adapted to monitor a volume of space, including a volume of intrusion 45 extending between the NIR illuminator 26 and the intended subject 40. Alternatively or additionally, other unconditional eye-safe optical imagers may be used. WFOV processor 28 and surveillance processor 18 are configured to detect intrusion by another subject 43, for example an animal such as a working dog, or people, into the volume of possible intrusion 45. System 10 may also be arranged to detect a subject moving in a manner such that the subject may enter or be within the volume 45 during NIR illumination of the eye of the intended subject.

Whilst in this particular embodiment the visible light imager 11 is used as a proximity sensor, other proximity sensors can be used instead of the visible light imager to determine whether a subject is intruding within the volume of possible intrusion 45. For example, sonar sensors, eye-safe light detection and ranging (LIDAR) sensors and other types of sensors known to those skilled in the art can be used instead of the visible imager. Also, in the illustrative embodiment of the system of FIG. 2, the volume of intrusion 45 is a cone-shaped 3-dimensional region centered on the line between the illuminator module 26 and the head of the subject 40 to be illuminated. However, alternative shaped regions of possible intrusion, such as wedge-shaped regions, can be employed which will depend on the type of proximity sensor(s) used.

Figure 5:
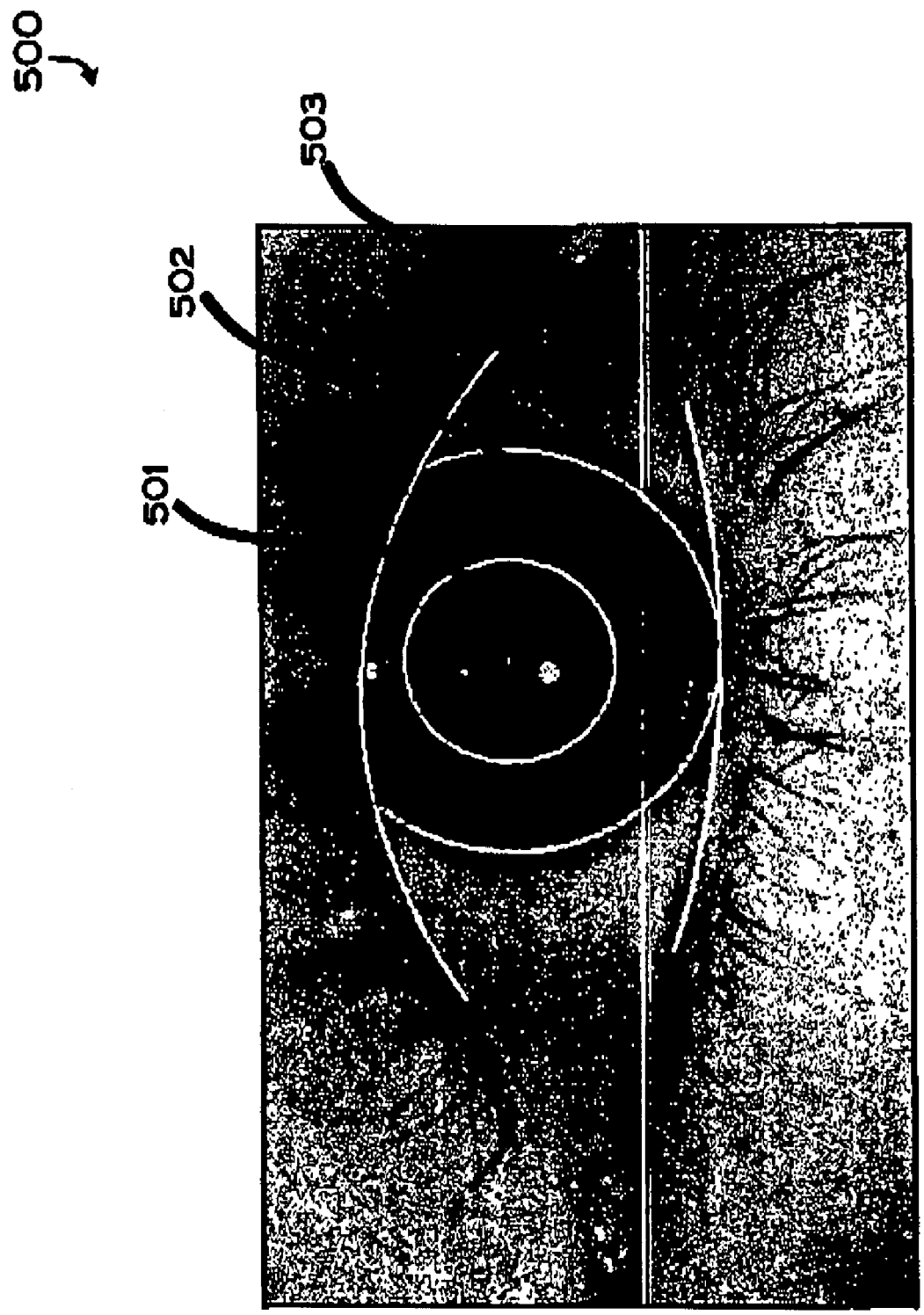
FIG. 5 illustrates a captured image of an eye of the intended subject shown in FIG. 2 according to one embodiment.

NFOV and MFOV camera modules 14 & 13 are adapted to capture images of the face of the intended subject illuminated with unconditional eye safe light. FIG. 5 illustrates an example image 500 of the eye of the subject of FIG. 2 captured by camera module 14 or 13. The iris processor 25 is operably to examine captured images of the eye of an intended subject and to estimate the optical gain of the observed eye. That estimated optical gain is reported via the surveillance processor 21 to the system processor 32, to determine a substantially maximum permissible eye-safe NIR illumination that can be applied to the observed eye and to generate an output control signal to the illuminator module 15 to set the NIR optical energy illuminating therefrom to an eye safe intensity and duration.

System processor 32 is adapted to send an output control signal to the illuminator module 26 so that the illuminator controller 27 inhibits the NIR optical energy illuminating therefrom, in response to the system processor receiving a proximity signal from the surveillance processor 21.

The surveillance processor 21 can also provide an independent assessment of whether individual subjects, such as persons and animals, in an area have been recently illuminated and for avoiding re-illuminating them unnecessarily. The face/iris recognition processor 29 is operable to recognize faces or clothing color or other short-term stable measures that can imply identity from captured visible light images of the subject. Surveillance processor 21 is adapted to assess from the subject's observed characteristics the likelihood that a potential NIR illumination subject is one that has recently been illuminated. In such cases, an avoidance probability algorithm, executable on the surveillance processor, assumes that a weighted probability of reselecting that subject for illumination is reduced as a function of the time since the last potential illumination.

Figure 3:
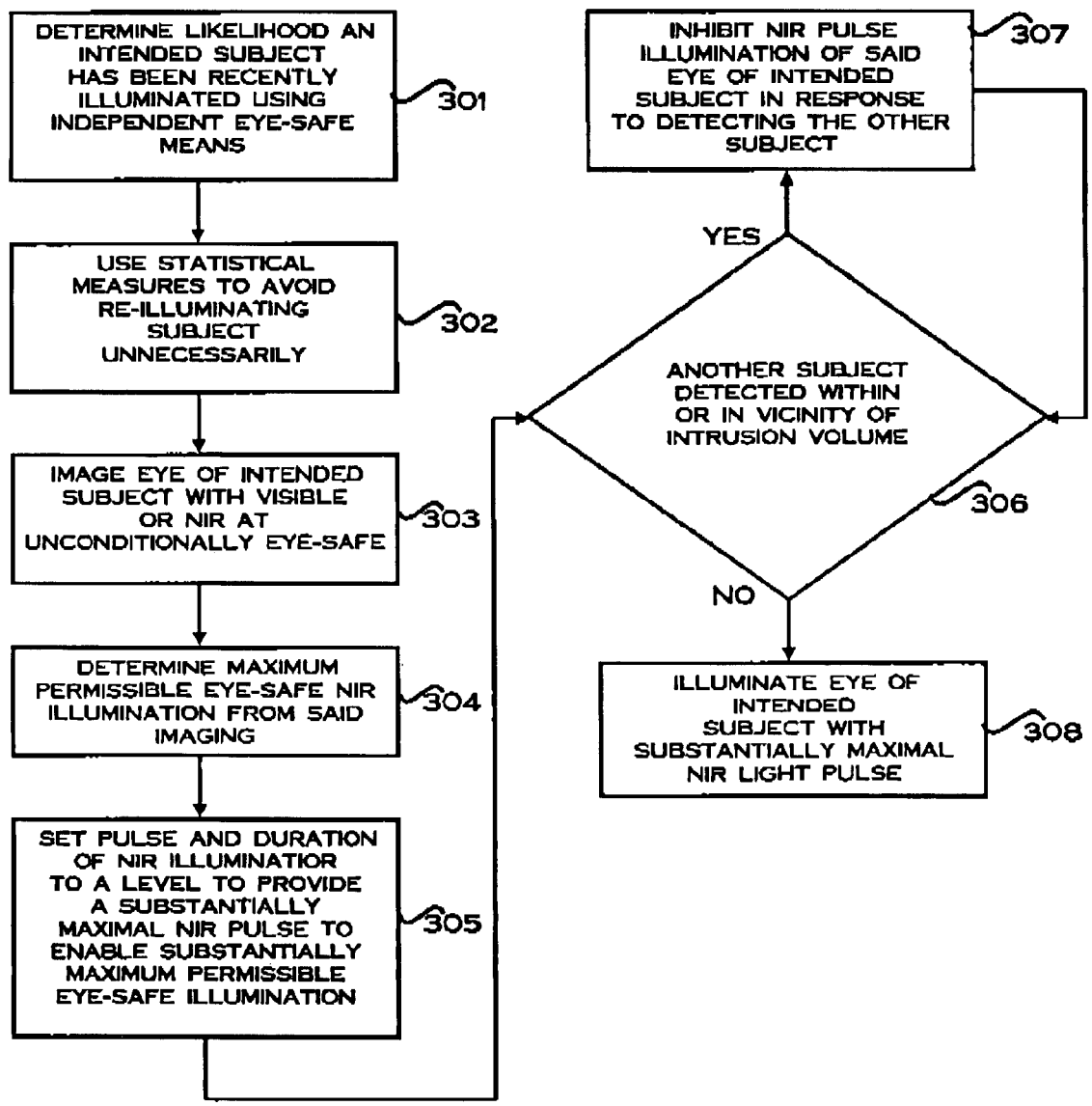
FIG. 3 illustrates a flow-diagram outlining a method for eye safe NIR optical illumination according to a preferred embodiment.

FIG. 3 illustrates a flow-diagram outlining a method for eye-safe NIR optical imaging illumination according to one embodiment. Implementation of this method 300 using the system 10 of FIG. 1 will now be described in more detail. Let us assume by way of example that, initially, a face of a subject 40 is located at the target area 46 (FIG. 2) and there is no other subject intruding within the illumination region 7 of the system 10. In process step 101 of FIG. 3, system 10 initially determines the likelihood that subject 40 has been recently illuminated, as indicated in step 301. To this end, surveillance processor 21 is operable to recognize faces, via face/iris recognition processor 29, or clothing color or other short-term stable measures that can imply identity from captured visible light images of the subject. This recognition process is similar to the recognition process used in the combined face and iris recognition system (CFAIRS) disclosed in U.S. patent application Ser. No. 11/681,752.

Thereafter, the surveillance processor 21 uses the implied identity derived from these recognition processes to assess the likelihood that the subject has been recently illuminated, after which the system processor 32 can avoid selecting the subject with an avoidance probability that decreases with the time since the last inferred NIR illumination, to avoid re-illuminating the subject unnecessarily (process step 302), so that the accumulated NIR illumination received by the subject's eyes can be held to total exposure levels well below long-term-safe levels while still permitting a small probability that identical twins and/or other apparent look-alike individuals will all be illuminated and imaged by the system.

For example, an avoidance algorithm according to one embodiment can establish a probability for re-illumination of 10% for the first 15 minutes after that most recent illumination, then increase linearly to 100% four hours after that most recent illumination, then hold steady at 100%. This minimal algorithm is a time-weighted means of increasing the re-imaging probability of someone recently imaged from near zero to near 100% over a parameterized time of 15 minutes to hours and can be expressed as follows:

selectionProbability (timeSinceLastImaged)=10%+ 90%*min(max(timeSinceLastImaged, 15 min), 4 hr)/(3 hr 45 min).

This produces a curve that is flat at 10% for the first 15 minutes, then increases linearly to 100% at 4 hours, then stays at 100%.

More sophisticated avoidance algorithms can be used which also take into account the percentage of the time since last illumination that the subject appeared to be within the overall area of observation, under the assumption that their identity could not change when they were under continuous observation. Such an algorithm can cause the duration of reduced probability in the prior example to be four hours (as in the aforementioned example) when the subject is continuously in view, 30 minutes when the subject has been continuously out of view, and a linear variation between those two durations based on the percentage of time that the subject was in view during that interval.

Following process step 302, an eye of the intended subject is illuminated with NIR light at an unconditionally eye-safe illumination level by the Illuminator 26 and imaged by the NFOV camera module 14, capturing images of the NIR illuminated eye for processing by the iris processor 25 (process step 303). The MFOV camera module 13 captures images of the eye illuminated with ambient visible light instead of NIR light from the illuminator. The NFOV camera module 14 also may have the ability to capture images illuminated with ambient visible light. As will be explained in more detail below, the system processor 32 then determines a substantially maximum permissible eye-safe NIR illumination that can be applied to the eye (process step 304) based on features of the iris and pupil of the eye extracted from the captured images by the iris processor 25. Operation of system 10 of FIG. 1 for the purpose of imaging the eye and extracting eye features from the images is similar to that of the combined face and iris recognition system (CFAIRS) of Honeywell, Del., an example of which is disclosed in U.S. patent application Ser. No. 11/681,752 and which is incorporated herein by reference.

The system processor 32 then sends an output control signal to the illuminator controller 27 of the illumination module to set the pulse duration and intensity of the NIR light source 42 to a level that will provide the substantially maximum permissible eye-safe NIR illumination at the eye (process step 305).

Eye safety constraints limit the pulse duration, amplitude, and period before re-illumination. Lower duration pulses of a given amplitude, or lower amplitude pulses of a given duration, or greater time intervals before re-illumination are always permitted. If the NFOV camera has no motion compensation, the NIR pulse duration is typically of the order of 25 microseconds for a subject at a distance of 4 to 5 meters. If the camera has the ability to provide fine tracking of subject movement, so that the maximum jitter in the subject's iris image on the NFOV camera's sensor is less than 10% of the width of a pixel (about 0.2 microns (micrometers) at the sensor, or about 12 microns at the subject), then a longer pulse can be used and the sensor can integrate the returned energy to give a better image with reduced signal/noise.

Visible light imager 11 in conjunction with WFOV processor 28 and surveillance processor 18 can detect another subject 43 intruding in the cone shaped or wedged shaped intrusion volume 45 (see FIG. 2) or moving in a manner such that the another subject may be within the volume during operation of the NIR illuminator to illuminate the eye of the intended subject (process step 306). The system processor 32, in response to receiving a notice of actual or anticipated intrusion from the surveillance processor 21, inhibits activation of the illumination controller 27 so that there is no risk of the eyes of the another subject being exposed to NIR illumination (process step 307). In the method of the illustrative embodiment of FIG. 3, process steps 306 and 307 are implemented following setting of the pulse duration and intensity of the NIR light source 42 to a level that will provide the substantially maximum permissible eye-safe NIR illumination at the eye (process step 305). However, the process of inhibiting activation of the illuminator in response to detection of the another subject (process steps 306,307) can be implemented whether or not the NIR pulse is nominal or maximal, that is, process steps 306 and 307 can also be implemented prior or after any of process steps 301-304

Thereafter, if the system 10 does not detect the another subject 43 the system processor 32 then sends an output control signal to the illuminator controller 27 to cause the illuminator to illuminate the intended subject with the NIR pulse so as to undertake process step 308.

Advantageously, determining the maximum permissible eye-safe NIR illumination for the eye of the subject from the captured images and illuminating the eye of the intended subject with at least one substantially maximal NIR light pulse having a pulse duration and intensity selected to provide the substantially maximum permissible eye-safe NIR illumination at the eye reduces the inherent noise within those images and allows the distance at which the eyes can be imaged to be maximized.

The process steps 303 & 304 (see FIG. 3) will now be described in more detail with reference to FIG. 4, which illustrates a flow-diagram showing in more detail process steps 303 & 304 according to one embodiment, and also FIGS. 1, 2, and 5. MFOV camera module 13 and face processor 18 or iris processor 25 may initially determine the color of the eye of the intended subject 40 (process step 401).

System 10 can image the eye of the intended subject in visible light so that the system can determine the eye-safe NIR illumination level for a substantially light colored eye (e.g., blue, green or hazel), and can image the eye of the intended subject with NIR light so that the system can determine the eye-safe NIR illumination level for a substantially dark colored eye or for an eye of any color.

Figure 4:
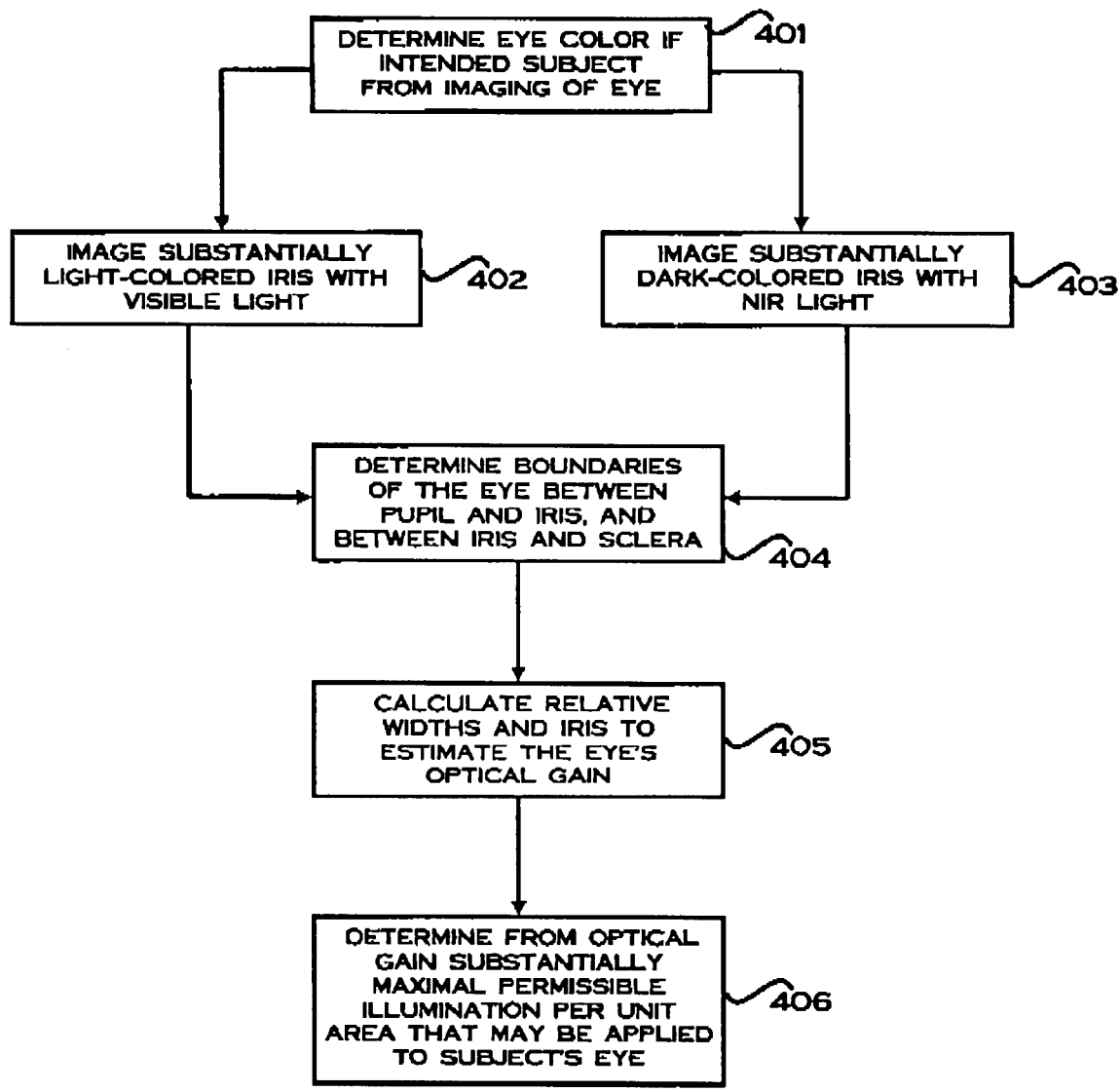
FIG. 4 illustrates, in more detail, the process steps 303 & 304 according to one embodiment.

Visible light imager 11, which may be either the MFOV camera 17 or the NFOV camera 22 (see FIG. 1), images a substantially light colored iris with visible light, as indicated in process step 402 of FIG. 4, so as to permit determination of the mean angular width and mean color of the iris 502 (see FIG. 5). When the iris is a dark color (e.g., dark brown or black), the boundary between the pupil 502 and iris 501 generally is not determinable in visible light. In this case, the iris is imaged with unconditionally-eye-safe NIR light, usually of a reduced intensity, as indicated in step 403. The substantially dark colored eye is imaged with NIR light by the Illuminator module 26 illuminating the eye with NIR light at an unconditionally eye-safe illumination level and the camera module 14 capturing images of the NIR illuminated eye for processing by the iris processor 25.

Thereafter, the iris processor 25 extracts eye features from the captured image and determines the boundaries of the eye between the pupil and iris, and between iris and sclera from the captured image, as indicated in process step 404.

Then, the relative mean widths of the pupil and iris are determined to estimate the optical gain (see process step 405). Information on the relative pupil and iris widths is obtained from the difference in reflectivity of the illumination from the iris area (higher reflectivity) versus the pupil area (lower reflectivity), where the median intensity of the latter reflection is dominated by reflection from the retina and lens of the eye. In this case the relative widths of the pupil and iris are inferred with some bounded uncertainty by the iris processor 25, and thus the iris processor 25 computes the ratio of pupil to iris width with related bounded uncertainty. The ratio of pupil to iris width is indicative of the maximum ocular magnification within the eye in its current configuration, relative to light originating at a considerable distance from the eye. The correspondence between different values of this pupil/iris ratio and the magnification of concern may be determined by theory or experiment.

In system 10, assessment of the pupil diameter in the eye is carried out by the iris processor 25, whether obtaining input from the MFOV camera 17 for light-colored eyes, or for any eye color using input from the NFOV camera 22. If the NFOV camera can image in visible light, then that is a preferable source to the MFOV camera. However, if the NFOV camera 22 can image only NIR light, then the iris processor uses an image of the subject's eye captured after a trial low-level eye-safe NIR illumination of that eye, determining the pupil diameter from the relative reflectivity of the pupil/iris/sclera as measured by the NFOV camera 22. As the iris processor has the algorithms to determine the pupil/iris/sclera boundaries reliably, this task is allocated to the iris processor.

Once determined, knowledge of the magnification can be used by the system processor 32 to determine the maximum permissible intensity of an illumination pulse of a given duration (process step 406), such that the resulting energy delivered to the subject's retina is within limits determined from physical considerations: heat removal processes within the retina and its backing choroid layer, and peak energy limitations of retinal (particularly foveal) cells.

Advantageously, such computational determinations extend the art of eye safety beyond that of current practice, which pessimistically assumes a worst-case dark-adapted eye and approximates poorly the actual energy dissipation processes within the mammalian eye. When applied in real use, with suitable safety factors, such determinations permit substantially maximal NIR illumination of observed eyes, thereby maximizing the distance at which the irises of those eyes can be imaged at a given resolution and minimum modulation index and/or reducing the inherent noise within those images.

In alternative embodiments of the method for eye-safe NIR optical imaging illumination, process steps 301, 302 and/or process steps 306, 307 of the method 300 of the illustrative embodiment of FIG. 3 are optional. For example, in one alternative embodiment of the method, the system can simply image the eye of the intended subject according to process step 303, determine the maximum permissible eye-safe illumination according to process steps 304, and then set the pulse and duration of the NIR illuminator and illuminate the eye with the substantially maximal NIR light pulse according to process steps 305 and 308.

Also, in another alternative embodiment of the method, a light colored iris can be imaged with NIR illumination instead of with visible light, in which case process steps 401 and 402 of FIG. 4 would be redundant and process step 403 would be modified to imaging any colored eye with NIR light.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims.

It is contemplated that the use of the present invention can involve components having different characteristics. It is intended that the scope of the present invention be defined by the claims appended hereto, giving full cognizance to equivalents in all respects.

Having thus described the invention what is claimed is:

1. A method for eye-safe near infra-red (NIR) optical imaging illumination comprising
    imaging an eye of an intended subject with visible or NIR light at an unconditionally eye-safe illumination;
    determining from said imaging a substantially maximum permissible eye-safe NIR illumination that can be applied to said eye; and
    illuminating said eye with at least one substantially maximal NIR light pulse having a pulse intensity and duration selected to provide said substantially maximum permissible eye-safe NIR illumination at said eye.

2. The method of claim 1, wherein imaging said eye of an intended subject comprises:
    operating an NIR illuminator to illuminate said eye with said NIR light at an unconditionally eye-safe illumination level; and
    wherein illuminating said eye with at least one substantially maximal NIR light pulse having a pulse intensity and duration selected to provide said substantially maximum permissible eye-safe NIR illumination comprises:
    adjusting said NIR illuminator to select the pulse intensity and/or duration of the at least one substantially maximal NIR pulse preparatory to operating said NIR illuminator to illuminate said eye with said at least one substantially maximal NIR pulse.

3. The method of claim 1, further comprising determining from imaging of said eye of an intended subject the color of said eye.

4. The method of claim 3, wherein imaging said eye of said intended subject with unconditional eye-safe illumination comprises
    capturing images of the pupil and iris of a substantially light colored eye illuminated with visible light at an unconditionally eye-safe illumination level; and
    wherein determining said substantially maximum permissible eye-safe NIR illumination level from said captured images comprises
    estimating the optical gain of said eye from said imaged pupil and iris; and
    calculating the substantially maximum permissible eye-safe NIR illumination level from said optical gain.

5. The method of claim 1, wherein imaging said eye of said intended subject with unconditionally eye-safe illumination comprises
    capturing images of the pupil and iris of a substantially dark colored eye illuminated with NIR light at an unconditionally eye-safe illumination level; and
    wherein determining the substantially maximum permissible eye-safe NIR illumination that may be applied to said eye of said intended subject from said captured images comprises
    estimating the optical gain of said eye of said intended subject from said imaged pupil and iris; and
    calculating said substantially maximum permissible eye-safe illumination from said estimated optical gain.

6. The method of claim 1, further comprising detecting another subject who may have an eye at risk at or in the vicinity of a volume extending between an NIR illuminator for illuminating said at least one substantially maximal NIR pulse and said intended subject; and
    inhibiting NIR illumination in response to detecting the eye of the subject.

7. The method of claim 1,
    further comprising
    assessing from said unconditional eye-safe imaging of said eye whether said intended subject has been recently illuminated; and
    illuminating or avoiding illuminating said intended subject with at least one substantially maximal NIR pulse based on whether said intended subject has been recently illuminated.

8. The method of claim 7, further comprising executing an algorithm for determining an avoidance probability to avoid re-illuminating said subject unnecessarily, said avoidance probability decaying with the time since most recent likely illumination.

9. The method of claim 1, wherein said at least one substantially maximal NIR pulse comprises a collimated NIR beam of substantially constant diameter or a diverging NIR beam.

10. A method for eye-safe near infra-red (NIR) optical imaging illumination comprising
   illuminating an eye of an intended subject with visible light or NIR light at an unconditionally eye-safe illumination level;
   capturing images of said eye illuminated with said visible or NIR light
   determining from said captured images the maximum permissible eye-safe NIR illumination that can be applied to said eye;
   illuminating said eye of said intended subject with at least one substantially maximal NIR light pulse, said at least one substantially maximal NIR light pulse having a pulse intensity and duration selected to provide said substantially maximum permissible eye-safe NIR illumination intensity at said eye;
   detecting another subject who may have an eye at risk, either within a volume extending between said NIR illuminator and said intended subject or moving in a manner such that said eye of said another subject may come within said volume during said illumination of said eye of said intended subject with said at least one NIR pulse, and
   avoiding illuminating said eye of said intended subject with said at least one NIR pulse in response to detecting the potential for harm to an eye of the another subject.

11. The method of claim 10, wherein illuminating said eye with NIR light at said conditionally eye-safe illumination level comprises;
   operating an NIR illuminator to illuminate said eye with said NIR light at said unconditionally eye-safe illumination level; and
   wherein illuminating said eye with at least one substantially maximal NIR light pulse having a pulse intensity and duration selected to provide said substantially maximum permissible eye-safe NIR illumination comprises
   adjusting said NIR illuminator to select said pulse intensity and duration of said at least one substantially maximal NIR pulse preparatory to operating said NIR illuminator to illuminate said eye with said at least one substantially maximal NIR pulse.

12. The method of claim 11, wherein capturing images of said eye comprises
   capturing images of the pupil and iris of a substantially light colored eye illuminated with visible light at an unconditionally eye-safe illumination level; and
   wherein determining said maximum permissible eye-safe NIR illumination level from said captured images comprises
   estimating the optical gain of said eye from said imaged pupil and iris; and
   calculating the maximum permissible eye-safe NIR illumination level from said optical gain.

13. The method of claim 11, wherein capturing said images comprises
   capturing images of the pupil and iris of any colored eye of said subject with NIR light;
   estimating the optical gain of said eye; and
   determining the substantially maximum permissible eye-safe illumination of based on said estimated optical gain.

14. The method of claim 10,
   wherein avoiding illuminating said eye of said intended subject with said at least one NIR pulse in response to detecting the potential for harm to an eye of the another subject comprises
   assessing from said unconditional eye-safe imaging whether said intended subject has been recently illuminated; and
   avoiding illuminating said intended subject with at least one NIR pulse based on whether said intended subject has been recently illuminated.

15. The method of claim 14, further comprising executing an avoidance probability algorithm that decays with time since any most recent likely illumination to avoid re-illuminating said subject unnecessarily.

16. An eye safe NIR optical imaging illumination system comprising
   at least one camera for capturing images of an eye of an intended subject illuminated with visible or NIR light at an unconditionally eye-safe illumination level;
   an NIR illuminator for illuminating said eye of said intended subject; and
   a controller operably coupled to said camera and said NIR illuminator, wherein said controller is adapted and arranged to
      determine from said captured images of said eye of said intended subject the maximum permissible eye-safe NIR illumination that can be applied to said eye; and
      operate said NIR illuminator to illuminate said eye of said intended subject with at least one substantially maximal NIR light pulse having a pulse duration and intensity selected to provide said substantially maximum permissible eye-safe NIR illumination at said eye.

17. The system of claim 16, further comprising:
   a sensor, operably coupled to said controller, adapted to detect another subject who may have an eye at risk at or in the vicinity of a volume extending between said NIR illuminator and said intended subject; and
   wherein said controller is further adapted and configured to adjust said NIR illuminator to inhibit said at least one substantially maximal NIR pulse illumination in response to said sensor detecting the another subject who may have an eye at risk.

18. The system of claim 16, wherein said sensor comprises said at least one camera.

19. The system of claim 16, further comprising:
   wherein said controller is further adapted and arranged to independently assess from said unconditional eye-safe imaging whether said intended subject has been recently illuminated; and
   operate said NIR illuminator to illuminate said intended subject with at least one substantially maximal NIR pulse based on whether the subject has been recently illuminated.

* * * * *